(12) United States Patent
Shkolnikov et al.

(10) Patent No.: US 11,759,793 B2
(45) Date of Patent: *Sep. 19, 2023

(54) OBJECT SEPARATING

(71) Applicant: Hewlett-Packard Development Company, L.P., Spring, TX (US)

(72) Inventors: Viktor Shkolnikov, Palo Alto, CA (US); Daixi Xin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,479

(22) Filed: Nov. 9, 2022

(65) Prior Publication Data
US 2023/0071219 A1 Mar. 9, 2023

Related U.S. Application Data

(63) Continuation of application No. 16/606,869, filed as application No. PCT/US2018/015668 on Jan. 29, 2018, now Pat. No. 11,554,377.

(51) Int. Cl.
| | |
|---|---|
| B25J 9/06 | (2006.01) |
| B03C 5/02 | (2006.01) |
| B01D 17/06 | (2006.01) |
| B25J 9/00 | (2006.01) |
| B25J 9/16 | (2006.01) |

(52) U.S. Cl.
CPC ............. *B03C 5/026* (2013.01); *B01D 17/06* (2013.01); *B03C 5/028* (2013.01); *B25J 9/0087* (2013.01); *B25J 9/06* (2013.01); *B25J 9/1666* (2013.01)

(58) Field of Classification Search
CPC ........ A23G 3/021; A23G 3/0008; A23G 3/20; A23G 9/228; A23G 9/28; A23G 3/0226; G01F 1/74; G01F 1/661; G01F 1/584; B01D 19/0084; B01D 17/06; B03C 5/026; B03C 5/028; B01L 3/502761; B01L 2400/0424; B01L 2200/0668; B01L 2400/0481; B01L 2300/0645
See application file for complete search history.

(56) References Cited

U.S. PATENT DOCUMENTS

| | | |
|---|---|---|
| 5,489,506 A | 2/1996 | Crane |
| 5,814,200 A | 9/1998 | Pethig et al. |
| 6,994,078 B2 * | 2/2006 | Roberts .............. B01D 19/0042 123/572 |

(Continued)

FOREIGN PATENT DOCUMENTS

WO 2017/127120 A1 7/2017

OTHER PUBLICATIONS

Malyan et al., Dielectrophoretic dual-frequency electrode array for the manipulation of sub-micron sized particles, 2002, IEEE, p. 2454-2459 (Year: 2002).*

(Continued)

*Primary Examiner* — McDieunel Marc
(74) *Attorney, Agent, or Firm* — Foley & Lardner LLP

(57) ABSTRACT

An object separator may include a substrate, a fluid channel supported by the substrate, a pair of electrodes along the fluid channel to form a dielectrophoretic force to interact with an object entrained in a fluid, and an inertial pump supported by the substrate and positioned within the fluid channel to move the fluid along the fluid channel.

20 Claims, 4 Drawing Sheets

(56) References Cited

U.S. PATENT DOCUMENTS

| | | | |
|---|---|---|---|
| 7,492,167 B2* | 2/2009 | Reich | G01N 33/48707 |
| | | | 324/660 |
| 8,834,698 B2 | 9/2014 | Lau et al. | |
| 9,480,935 B2* | 11/2016 | Mariella, Jr. | B01D 17/06 |
| 11,554,377 B2* | 1/2023 | Shkolnikov | G01F 1/74 |
| 2002/0182654 A1 | 12/2002 | Jing et al. | |
| 2004/0026250 A1 | 2/2004 | Cummings et al. | |
| 2004/0226819 A1 | 11/2004 | Talary et al. | |
| 2005/0161030 A1* | 7/2005 | Roberts | B01D 19/0042 |
| | | | 123/572 |
| 2007/0187248 A1 | 8/2007 | Hodko et al. | |
| 2010/0204459 A1* | 8/2010 | Mason | B01J 13/0004 |
| | | | 204/600 |
| 2015/0268244 A1 | 9/2015 | Cho et al. | |
| 2016/0114319 A1 | 4/2016 | McGuinness et al. | |
| 2016/0334323 A1 | 11/2016 | McGuinness et al. | |
| 2022/0389366 A1* | 12/2022 | Barras | C12M 41/36 |

OTHER PUBLICATIONS

Hilber et al., Droplet and particle manipulation in emulsions and suspensions using 3D electro-osmotic micropumps, 2008, IEEE, pg. (Year: 2008).*

Poorreza et al., A miniaturized electrokinetic bioparticle microseparator based on travelling wave dielectrophoresis for lab on a chip applications, 2013, IEEE, p. 540-545 (Year: 2013).*

Čemažar et al., Dielectrophoretic Field-Flow Microchamber for Separation of Biological Cells Based on Their Electrical Properties, 2011, IEEE, p. 36-43 (Year: 2011).*

Evstrapov, A.A., "Physical Methods of Microparticle Transport and Separation Control in Liquid Media. I. Dielectrophoresis, Photophoresis, Ostophoresis, Optical Tweezers." Institute for Analytical Instrumentation RAS, Saint-Petersburg, vol. 15(2005) No. 1, pp. 3-20.

Hughes, M. P., "Strategies for dielectrophoretic separation in laboratory-on-a-chip systems", Electrophoresis, 2002, vol. 23, pp. 2569-2582.

* cited by examiner

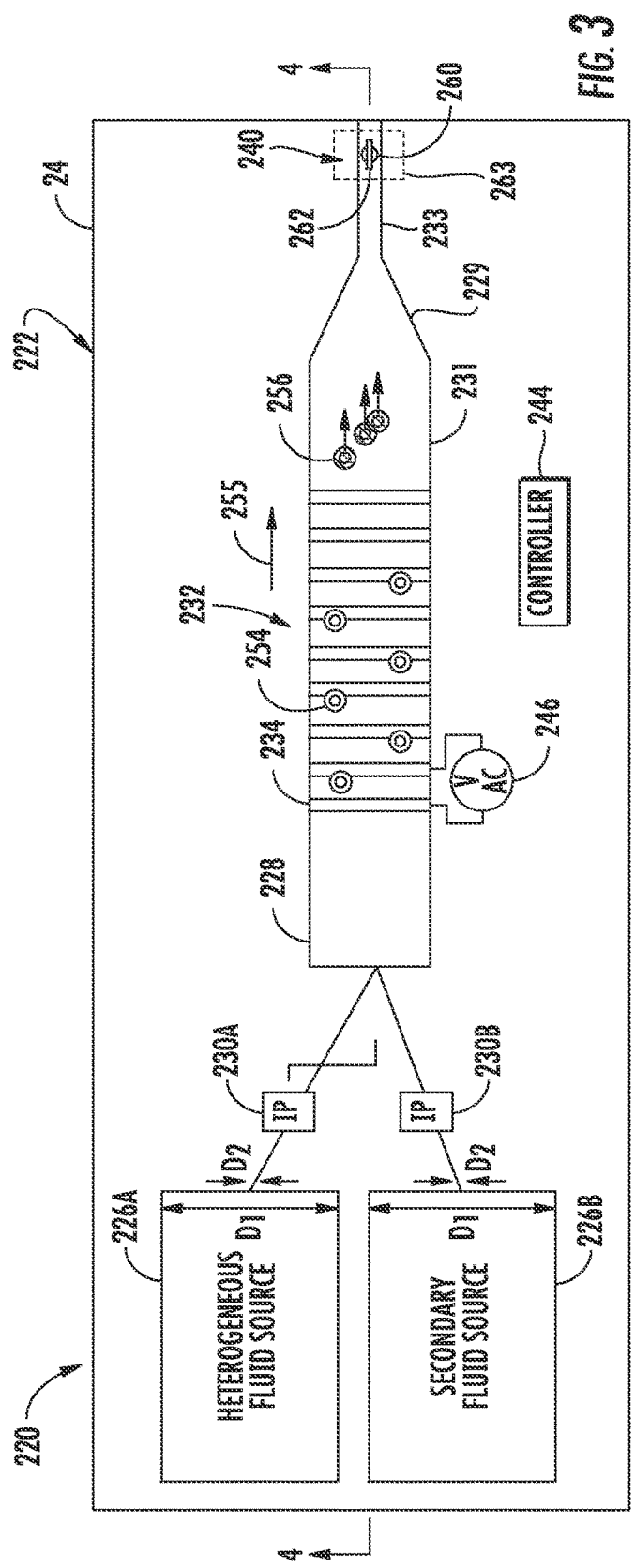
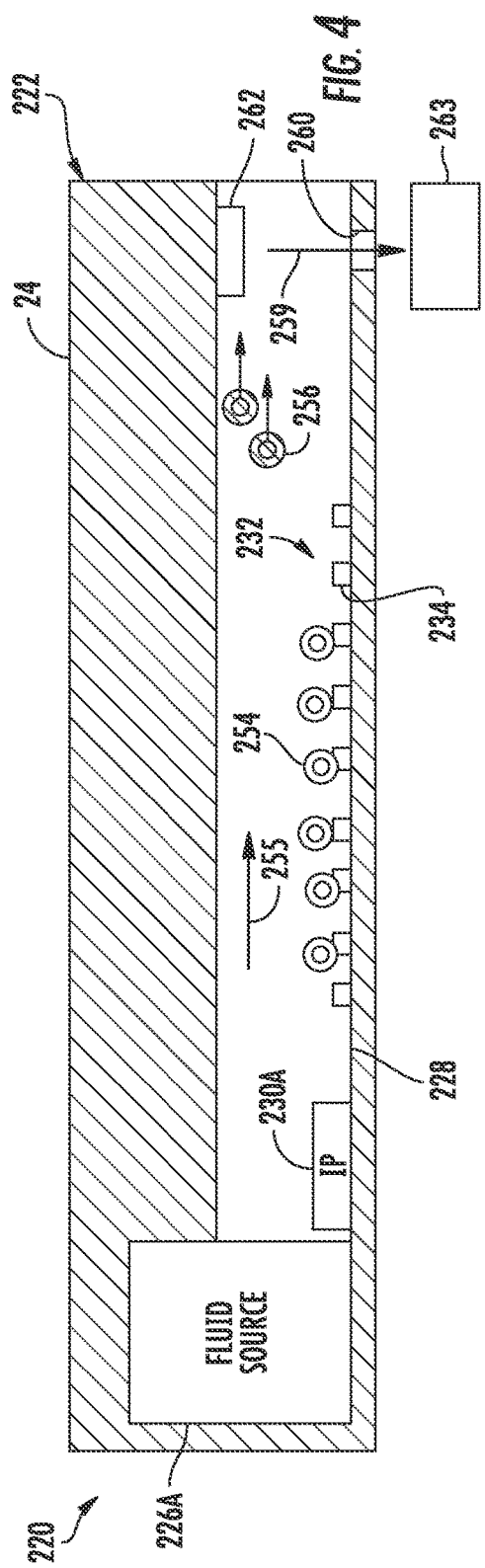

OBJECT SEPARATING

The present application is a continuation of U.S. patent application Ser. No. 16/606,869 filed on Oct. 21, 2019, which was a 35 U.S.C. 371 National Stage Application of PCT/US2018/015668 filed on Jan. 29, 2018, each of which is incorporated herein by reference.

BACKGROUND

The separation of objects in fluid such as the separation of cells, particles, bubbles and immiscible droplets, is performed in various industries. For example, in biology and medicine, rare cells are often separated from a patient's blood for diagnosis. The separation of objects, such as rare blood cells, presents many challenges.

BRIEF DESCRIPTION OF THE DRAWINGS

FIG. 3 is a schematic diagram illustrating portions of an example microfluidic device and an example object separator.

FIG. 4 as a sectional view of the object separator of FIG. 3 taken along line 4-4.

Figure 1:
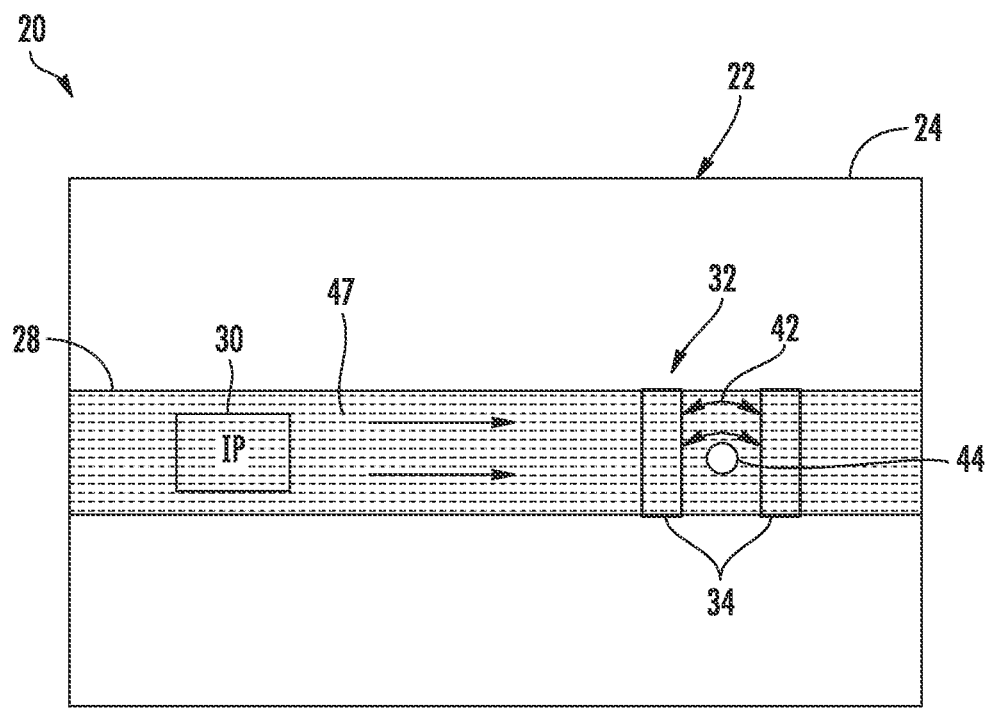
FIG. 1 is a schematic diagram illustrating portions of an example microfluidic device and an example object separator.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example object separators and object separating methods that may be used to facilitate the separation of fluid entrained objects out of a volume of fluid. The disclosed object separators utilize internally embedded inertial pumps to move fluid entraining objects through electric fields that exert a dielectrophoretic force upon the objects entrained in the fluid to facilitate separation of the objects. The internally embedded inertial pumps facilitate on-board or on-chip pumping of fluid to reduce cost and complexity. In some implementations, inertial pumps facilitate recirculation of the fluid which provide multiple passes of the fluid through the electric fields for potentially more thorough separation or extraction of objects from the fluid.

Dielectrophoresis (DEP) occurs when a force is exerted on a dielectric object/particle when it is subjected to a non-uniform electric field. The dielectrophoretic force does not charge the object. All objects/particles exhibit dielectrophoretic activity in the presence of electric fields depending upon (A) the fluid, (B) the object's electrical properties and (C) the frequency of the electric field. The disclosed object separators and object separating methods control the frequency of the electric field to selectively interact with particular objects in a flow or stream of fluid.

Disclosed herein are example object separators and object separating methods that utilize fluid ejectors to eject the objects that have been separated from the channel. For example, in one implementation, the object separators and separating methods utilize a fluid actuator that displaces fluid containing the separated object or objects through a nozzle. The fluid ejectors facilitate precise control over the timing and rate at which the separated objects are extracted from the object separator. The ejected objects may then be further processed.

Disclosed herein are example object separators and object separating methods that utilize a recirculation passage extending from the first side of electrodes to a second side of the electrodes. The recirculation passage facilitates multiple passes of the fluid and multiple object separation cycles to separate and extract a greater percentage of objects from the fluid. The recirculation passage may further facilitate the separation and extraction of different types of objects (having different electrical properties) during different passes of the fluid through the electrical fields. In one implementation, an additional inertial pump is utilized to pump fluid through the recirculation passage. In one implementation, after each pass, the separated objects may be ejected, such as with a fluid actuator through a nozzle opening.

Disclosed herein are example object separators and object separating methods that utilize both a recirculation passage and a holding reservoir connected to the recirculation passage. The holding reservoir may hold fluid containing various objects while selected first objects or a selected first type of objects separated by the electrodes are ejected to a first point of interest. The holding reservoir may hold fluid containing various objects while a first batch of fluid is repeatedly recirculated across the electrodes and targeted objects are captured or retained. The fluid within the holding reservoir may subsequently be processed across electrodes to separate selected second object or a selected second type of objects far subsequent ejection to a second point of interest.

Disclosed herein are example object separators and object separating methods that utilize a controller to apply electrical current with varying alternating frequencies to the electrodes at different times. In other implementations, the object separator may comprise an array of electrodes, wherein the controller applies different alternating frequencies across different pairs of electrodes to attract (or repel) different types of objects within the fluid being pumped by the inertial pump. In some implementations, the objects separated from the fluid are pumped across an object sensor or counter, wherein the controller controls the actuation of the inertial pump, the recirculation of the fluid (when a recirculation passage is provided), the withdrawal of fluid from the holding reservoir (when a holding reservoir is provided) and the creation of the electric field and their alternating frequencies by the controller based upon signals from the object sensor.

In some implementations, the object separators include microfluidic passages or channels. Microfluidic channels may be formed by performing etching, microfabrication (e.g., photolithography), micromachining processes, or any combination thereof in a substrate of the fluidic die. Some example substrates may include silicon based substrates, glass based substrates, gallium arsenide based substrates, plastic based substrates, cellulose or paper based substrates, and/or other such suitable types of substrates for microfabricated devices and structures. Accordingly, microfluidic channels, passages, chambers, orifices, and/or other such features may be defined by surfaces fabricated in the substrate of a fluidic die. Furthermore, as used herein a microfluidic channel or passage may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

As used herein, an inertial pump corresponds to a fluid actuator and related components disposed in an asymmetric position in a fluid channel, where an asymmetric position of the fluid actuator corresponds to the fluid actuator being positioned less distance from a first end of the fluid channel as compared to a distance to a second end of the fluid channel. Accordingly, in some examples, a fluid actuator of an inertial pump is not positioned at a mid-point of a fluid channel. The asymmetric positioning of the fluid actuator in the fluid channel facilitates an asymmetric response in fluid proximate the fluid actuator that results in fluid displacement when the fluid actuator is actuated. In such implementations, the inertial pump is located proximate to (asymmetrically closer to) a reservoir or chamber having a dimension at least three times a size of the outlet of the chamber to the channel or passage containing the fluid actuator. Repeated actuation of the fluid actuator causes a pulse-like flow of fluid through the fluid channel.

In some examples, an inertial pump includes at least one thermal actuator having a heating element (e.g., a thermal resistor) that may be heated to cause a bubble to form in a fluid proximate the heating element. In such examples, a surface of a heating element (having a surface area) may be proximate to a surface of a fluid channel in which the heating element is disposed such that fluid in the fluid channel may thermally interact with the heating element. In some examples, the heating element may comprise a thermal resistor with at least one passivation layer disposed on a heating surface such that fluid to be heated may contact a topmost surface of the at least one passivation layer. Formation and subsequent collapse of such bubble may generate flow of the fluid. As will be appreciated, asymmetries of the expansion-collapse cycle for a bubble may generate such flow for fluid pumping, where such pumping may be referred to as "inertial pumping."

In other examples, the fluid actuator(s) forming an inertial pump may comprise piezo-membrane based actuators, electrostatic membrane actuators, mechanical/impact driven membrane actuators, magnetostrictive drive actuators, electrochemical actuators, external laser actuators (that form a bubble through boiling with a laser beam), other such microdevices, or any combination thereof. In some implementations, the fluid actuators may displace fluid through movement of a membrane (such as a piezo-electric membrane) that generates compressive and tensile fluid displacements to thereby cause inertial fluid flow.

As will be appreciated, the fluid actuator forming the inertial pump may be connected to a controller, and electrical actuation of the fluid actuator by the controller may thereby control pumping of fluid. Actuation of the fluid actuator may be of relatively short duration. In some examples, the fluid actuator may be pulsed at a particular frequency for a particular duration. In some examples, actuation of the fluid actuator may be 1 microsecond (µs) or less. In some examples, actuation of the fluid actuator may be within a range of approximately 0.1 microsecond (µs) to approximately 10 milliseconds (ms). In some examples described herein, actuation of the fluid actuator includes electrical actuation. In such examples, a controller may be electrically connected to a fluid actuator such that an electrical signal may be transmitted by the controller to the fluid actuator to thereby actuate the fluid actuator. Each fluid actuator of an example microfluidic device may be actuated according to actuation characteristics. Examples of actuation characteristics include, for example, frequency of actuation, duration of actuation, number of pulses per actuation, intensity or amplitude of actuation, phase offset of actuation.

Disclosed herein is an object separator may include a substrate, a fluid channel supported by the substrate, a pair of electrodes along the fluid channel to form a dielectrophoretic force to interact with an object entrained in a fluid and an inertial pump supported by the substrate to move the fluid along the fluid channel.

Disclosed herein is an example method that may include moving fluid through a channel of the substrate with an inertial pump supported by substrate and applying a dielectrophoretic force to an object entrained in the fluid separate the object from other objects in the fluid.

Disclosed herein is an example method that may include moving a fluid entraining a first object and a second object through a channel during a first pass, applying a first dielectrophoretic force to the first object within the channel during the first pass to retain the first object within the channel, following the first pass, moving the fluid to a holding reservoir, altering application of the dielectrophoretic force to release the first object within fluid channel and ejecting the released first object from the channel. The example method may further include moving the fluid from the reservoir through the fluid channel during a second pass, applying a second dielectrophoretic force to the second object during the second pass to retain the second object within the channel, following the second pass, altering application of the dielectrophoretic force to release the second object within the channel and ejecting the released second object from the channel.

FIG. 1 schematically illustrates portions of an example microfluidic device 20 having an example object separator 22. Object separator 22 pumps fluid and its entrained objects across at least one electrical field using an inertial pump, wherein the at least one electrical field exerts a dielectrophoretic force upon selected targeted objects to facilitate separation of the targeted objects from other non-targeted objects in the fluid. The microfluidic device is largely self-contained in that the inertial pumps are incorporated into or supported by the same substrate that supports the electrical field generating electrodes. Microfluidic device 20 reduces or eliminates the use of external fluid pumping devices and the fluid couplers or connectors that connect the external fluid pumping devices to the substrate. The incorporation of the inertial pumps into or onto the substrate of microfluidic device 20 further facilitates a reduction in the size and scale of microfluidic device 20. As a result, the microfluidic device 20 is less complex and is less costly. Object separator 22 comprises substrate 24, fluid channel 28, inertial pump 30, and an array 32 of electrodes 34.

Substrate 24 comprises at least one layer of material or materials. Examples of materials from which substrate 24 may be formed include, not limited to, silicon, glass, ceramics and/or polymers. In one implementation, substrate 24 may be formed from SUB. In other implementations, substrate 24 may be formed from other materials or combinations of materials.

Substrate 24 comprises comprise a body supporting inertial pump 30 and electrodes 34. Substrate 24 further forms or defines fluid channel 28. Thus, in an example, the inertial pump is present within the fluid channel. In one implementation, in which channel 28 comprises an internal tube or passage, substrate 24 completely surrounds channel 28 (where FIG. 1 is illustrating substrate 24 in section to schematically illustrate the channels/passages). In one implementation, the channels are formed by imprinting or molding of a layer material forming substrate 24. In another implementation, the channels are formed by cutting, ablation, etching or other material removal processes carried out on the layer or layers of material forming substrate 24. In another implementation, the channels are formed by selective deposition, such as printing or additive manufacturing processes carried out upon an underlying base layer or platform.

Fluid channel 28 is formed in substrate 24. In one implementation, fluid channel 28 comprises an internal tube or passage completely surrounded by the material of substrate 24 (where FIG. 1 is illustrating substrate 24 in section to schematically illustrate the channels/passages). In another implementation, fluid channel 28 may be formed by a groove extending into substrate 24, wherein the groove is covered by a lid or other structure. In one implementation, channel 28 may be formed by imprinting or molding of a layer material forming substrate 24. In another implementation, channel 28 may be formed by cutting, ablation, etching or other material removal processes carried out on the layer or layers of material forming substrate 24. In another implementation, channel 28 may be formed by selective deposition, such as printing or additive manufacturing processes carried out upon an underlying base layer or platform.

Fluid channel 28 is connected to a source of fluid 47 containing an object or objects to be subsequently separated by separator 22. Examples of the objects that may be separated include, but are not limited to cells, particles, bubbles and immiscible droplets. In one implementation, the objects that may be focused and/are separated consist of objects selected from a group of objects consisting of at least one of cells, particles, bubbles and immiscible droplets. Examples of the fluid that and trains the objects include, but are not limited to, water, phosphate buffered saline, phosphate buffered sucrose, fluorescence activated cell sorter (FACS) buffer, cell lysate media, cell culture media, blood, blood plasma, blood serum, urine, cerebral spinal fluid, tears and milk. Fluid channel 28 guides a flow of the fluid entraining the objects through the electrical field formed by the array 32 of field generating electrodes 34.

Inertial pump 30 displaces fluid and pumps fluid along fluid channel 28. Inertial pump 30 comprises at least one fluid actuator formed upon substrate 24 and asymmetrically positioned in a fluid channel 28, where an asymmetric position of the at least one fluid actuator corresponds to the fluid actuator being positioned less distance from a first end the respective passage as compared to a second end of fluid channel 28 on an opposite side of electrodes 34 as an inertial pump 30. The at least one fluid actuator forming the inertial pump is not positioned at a mid-point of the passage between the source of the particular fluid and the end of channel 28 on an opposite side of electrodes 34 has an inertial pump 30.

The asymmetric positioning of the at least one fluid actuator in a fluid channel 28 facilitates an asymmetric response in fluid proximate the fluid actuator that results in fluid displacement when the fluid actuator is actuated. Repeated actuation of the at least one fluid actuator causes a pulse-like flow of fluid through respective passage towards and across electrodes 34.

In some examples, an inertial pump includes at least one thermal actuator having a heating element (e.g., a thermal resistor) that may be heated to cause a bubble to form in a fluid proximate the heating element. In such examples, a surface of a heating element (having a surface area) may be proximate to a surface of fluid channel 28 in which the heating element is disposed such that fluid in the microfluidic channel may thermally interact with the heating element. In some examples, the heating element may comprise a thermal resistor with at least one passivation layer disposed on a heating surface such that fluid to be heated may contact a topmost surface of the at least one passivation layer. Formation and subsequent collapse of such bubble may generate inertial flow of the fluid. As will be appreciated, asymmetries of the expansion-collapse cycle for a bubble may generate such flow for fluid pumping, where such pumping may be referred to as "inertial pumping."

In other implementations, the fluid actuators forming the inertial pump 30 may comprise piezo-membrane based actuators, electrostatic membrane actuators, mechanical/impact driven membrane actuators, magnetostrictive drive actuators, electrochemical actuators, laser heating, other such microdevices, or any combination thereof. In some implementations, the fluid actuator forming the inertial pump 30 may displace fluid through movement of a membrane (such as a piezo-electric membrane) that generates compressive and tensile fluid displacements to thereby cause fluid flow. Inertial pump 30 may be activated and controlled by electrical signals transmitted from a controller supported by substrate 24 or a remote controller across electric conductive wires, lines or traces formed within or upon substrate 24.

Electrodes 34 are situated along fluid channel 28 and array 32 of differently charged electrodes. In one implementation, adjacent or office electrodes have opposite surfaces that are spaced apart from one another such by a distance substantially (plus/minus 20%) equal to a dimension or diameter of the targeted object or objects to be targeted. In some implementations, different adjacent electrode pairs may have different spacings for retaining or attracting differently sized objects.

Electrodes 34 may be differently electrically charged so as to form a nonuniform electric field 42 between adjacent, consecutive or opposite pairs of electrons, wherein the nonuniform electric field 42 exerts a dielectrophoretic force upon object 44 or multiple objects 44 entrained in the fluid 46 (schematically represented by arrows) being inertially pumped along channel 28 across electrodes 34. Electrodes 34 may be at different electrical potentials relative to one another. For example, one of electrodes 34 may be at a positive or negative charge while the other of electrodes 34 is grounded. In yet another implementation, one electrodes 34 may be at a first nonzero charge while the other electrodes 34 and is at a second different non-zero electrical charge. The electrical current flowing through the different electrodes 34 may be different relative to one another. In one implementation, the electrical current in the charge electrode(s) is a nonuniform alternating current.

In one implementation, the electric field 42 has a strength sufficient so as to grab objects flowing through the electric field given the rate at which the fluid is inertially pumped across the electric field or through the electric field. In one implementation, the electric field has a field strength of at least 10 mV RMS and up to 1000 V RMS. The electric field strength may also vary depending upon spacing of electrodes 34.

In one implementation, the frequency of the alternating current is controlled so as to control what types of objects are targeted for separation. For example, for objects in the form of HeLa cells carried in a high conductivity solution, such as, for example, in a solution having a conductivity of 0.58 millisiemens/cm, an alternating current having a frequency within the range of 70 to 150 kHz, and nominally 120 kHz, may be used to attract and retain (target) such cells using dielectrophoretic forces. In other implementations, other alternating current frequencies ranging from 10 kHz to 1000 kHz may be applied to targets different objects depending upon the die electrophoretic properties of the objects themselves and the electrical properties of the medium carrying the objects, such as the electrical conductivity of the medium.

For purposes of this disclosure, a "targeted" or "target" object refers to an object to be held or retained by dielectrophoretic forces of a nonuniform electrical field. A "non-targeted" or "nontarget object" refers to an object that, is permitted to be carried through the nonuniform electrical field, past or across the electrodes forming the nonuniform electrical field. A "targeted" object may be an object of interest or the non-targeted object may be an object of interest. For example, dielectrophoretic forces may be used to retain objects of interest while those objects not of interest are allowed to flow out of the separator and wherein the retained objects of interest are subsequently released for collection, counting or analysis. Alternatively, dielectrophoretic forces may be used to retain those objects not of interest, wherein objects of interest are allowed to flow out of the separator for collection, counting or analysis Although electrodes 34 are schematically illustrated as bands of electrically conductive material extending across fluid channel 28, in a direction perpendicular to the direction in which fluid 46 is being inertially pumped by inertial pump 30, in other implementations, electrodes 34 may have other shapes and arrangements. For example, in other implementations, electrodes 34 may extend across fluid channel 28 in a direction oblique to channel 28 and oblique to the direction in which fluid 46 is being inertially pumped by inertial pump 30. In other implementations, electrodes 34 may comprise opposing electrodes on or along opposite interior faces of fluid channel 28. In other implementations, electrodes 34 may comprise interdigitated portions or may not extend completely across fluid channel 28, extending partially across fluid channel 28 or being spaced from opposite faces of channel 28.

Although array 32 is illustrated as comprising a pair of electrodes 34, in other implementations, array 32 may comprise greater than two electrodes, wherein the multiple electrodes form multiple pairs of adjacent electrodes. In some implementations, two adjacent "pairs" of electrodes may share a center electrode. For example, first and third charged electrodes may share a center electrode that is grounded. In some implementations, the electrodes of the array 32 may be sequenced between different electrical charges and/or frequencies. For example, the array 32 electrodes may comprise electrodes in numerical series, wherein during a first instance, the first and second electrodes form a first nonuniform electrical field, the third and fourth electrodes form a second nonuniform electrical field and so on down the series. During a second instance, the second and third electrodes form a first nonuniform electrical field, the fourth and fifth electrodes form a second nonuniform electrical field and so on down the series.

The dielectrophoretic force formed by charged electrodes 34 differently interacts with different objects based upon their different dielectric properties. The dielectrophoretic force may differently interact with a targeted object as compared to a non-targeted object, facilitating separation or different processing of the targeted objects versus nontargeted objects. In one implementation, the dielectrophoretic force may be attractive, retaining object 44 in place as a stream of fluid 46 carrying other objects having different properties than object 44 is inertially pumped past electrodes 34.

In one implementation, after the targeted objects or objects of interest have been retained by the dielectrophoretic force and the fluid, entraining the other objects not of interest, has been pumped past electrodes 34 and discharged or ejected, electrodes 34 may be differently charged, such as at a different frequency, so as to exert a dielectrophoretic force that repels the object 44, that was previously retained by the different dielectrophoretic force, away from electrodes 34. In such an implementation, inertial pump 30 may inertially pump a different fluid across electrodes 34 to carry the released objects 44 to a target destination. For example, one implementation, the released objects 44 may be inertially pumped to a location where the released objects 44 are counted, processed or ejected for collection or further processing.

Figure 2:
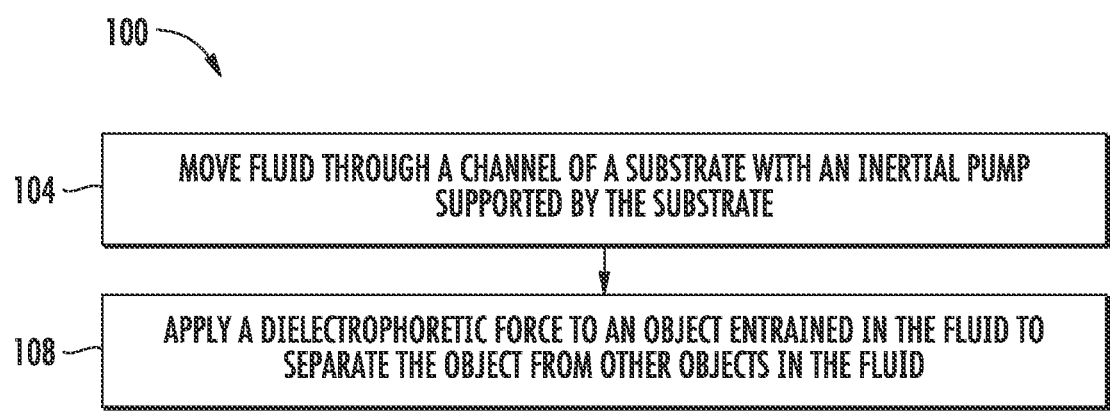
FIG. 2 is a flow diagram of an example object separation method.

FIG. 2 is a flow diagram of an example object separating method 100. Method 100 facilitates the separation of targeted or selected objects from other non-targeted objects in a fluid by inertially pumping a stream of the fluid through a nonuniform electrical field formed by charged electrodes, wherein the nonuniform electrical field exerts different dielectrophoretic forces upon targeted objects, as compared to nontargeted objects, to facilitate separation of the targeted objects. Although method 100 is described in the context of being carried out by object separator 22 of microfluidic device 20, it should be appreciated that method 100 may likewise be carried out with any of the microfluidic devices and object separator disclosed herein as well as other similar object separator's and microfluidic devices.

As indicated by block 104, inertial pump 30 inertially moves fluid through channel 28 of substrate 24. The fluid moving through the channel is directed across or through at least one non-uniform electrical field formed by electrodes 34 within channel 28. As indicated by block 108, the charged electrodes 34 apply a dielectrophoretic force to a targeted object or targeted objects entrained within the fluid being inertially pump within channel 28 so as to separate the targeted object from other nontargeted objects in the fluid stream.

FIGS. 3 and 4 illustrate portions of an example microfluidic device 220 and portions of an example object separator 222 provided on the microfluidic device 220. Object separator 222 comprises substrate 24 (described above), fluid sources 226A, 226B (collectively referred to as fluid sources 226), fluid channel 228, inertial pumps 230A, 230B (collectively referred to as inertial pumps 230), an array 232 of electric field generating electrodes 234, fluid ejector 240 and controller 244.

Fluid sources 226 comprise sources of fluid for fluid channel 28. Each of fluid sources 226 is connected to fluid channel 228. Each of fluid sources 226 226 has a fluid containing volume with a dimension D1 at least three times greater than the dimension D2 of fluid channel 228 to facilitate inertial pumping in the direction indicated by arrows 255 across the electrical fields produced by the array 232 of electrodes towards fluid ejector 240. Inertial pump 230 is asymmetrically positioned within fluid channel 228, positioned closer to fluid source 226 as compared to fluid ejector 240.

In the example illustrated, object separator 222 comprises two fluid sources 226A and 226B. Fluid source 226A comprises a volume formed in substrate 24 that stores or that receives a heterogeneous fluid from which objects are to be targeted. Examples of the heterogeneous fluids that may be supplied by fluid source 226A and in which different objects may be contained include, but are not limited to, water, phosphate buffered saline, phosphate buffered sucrose, fluorescence activated cell sorter (FACS) buffer, cell lysate media, cell culture media, blood, blood plasma, blood serum, urine, cerebral spinal fluid, tears and milk.

Fluid source 226B comprises a volume formed in substrate 24 that stores or that receives a secondary fluid. The secondary fluid is to be directed into fluid channel 228 after the targeted objects have been separated out of the heterogeneous fluid. In one implementation, the secondary fluid may comprise an elution or flushing fluid which carries released targeted objects out of channel 228 for collection or processing. In one implementation, secondary fluid may carry the released targeted objects to fluid ejector 240 for ejection. In another implementation, the secondary fluid may comprise a fluid that reacts with the targeted objects residing in separation region 231. For example, in one implementation, the secondary fluid may comprise a reagent that reacts with the targeted objects prior to discharge of the targeted objects from fluid channel 228 for ejection of the targeted objects by fluid ejector 240. In one implementation, the fluid within sources 226 are selectively directed to channel 228 by inertial pumps 230. In some implementations, additional valve mechanisms may be provided to selectively supply channel 228 with fluid from fluid sources 226.

In some implementations, fluid sources 226A and 226B may be provided by a single fluid source. In such an implementation, object separator 222 may comprise a single fluid source 226 in the form of a port or reservoir through which heterogeneous fluid 252 may be initially supplied and through which a secondary fluid may be subsequently supplied. After the heterogeneous fluid has been discharged from fluid source 266 and discharged from channel 228, fluid source 266 may be filled or supplied with a secondary fluid. The secondary fluid may then be inertially pumped through channel 228.

Fluid channel 228 extends from fluid source 226. Fluid channel 228 guides a flow of the heterogeneous fluid from fluid source 226, through the electrical fields formed by the array 232 of field generating electrodes 34 and to fluid ejector 40. In the example illustrated, fluid channel 228 has a tapering portion 229 which tapers from a larger separation region 231 to a smaller object ejection region 233 where fluid and targeted objects may be ejected by fluid ejector 240. In one implementation, object ejection region 233 has a cross-sectional area less than or equal to two times a minimum dimension of targeted objects to facilitate a single-file column or series of targeted objects flowing to fluid ejector 40 for ejection. The single file ordering facilitates precise control over a rate at which objects are ejected and an amount/number of objects being ejected. In other implementations, tapering portion 229 may be omitted, wherein the targeted objects are directed to fluid ejector 240 in a more random parallel fashion rather than a serial order. Although fluid channel 228 is illustrated as being substantially linear, it should also be appreciated that fluid channel 228 may be serpentine, curved or of other shapes.

Inertial pumps 230A, 230B inertially pump fluid from their respective fluid sources 226A, 226B. Each of inertial pumps 230 is similar to inertial pump 30 described above. The use of the embedded inertial pumps 230 as part of microfluidic device 220 facilitates a single integrated object separator in which both pumps and electrodes are supported by a single substrate 24. As a result, object separator 222 is less complex, less costly and may be more easily incorporated into a microfluidic chip.

Array 232 of electrodes 234 extends in serial fashion along the length of object separating region 231 of fluid channel 228. Each electrode comprises a band or region of electrically conductive material formed upon or within substrate 24 so as to conduct electrical current. Electrodes 234 cooperate with one another to form pairs of electrodes across which a nonuniform electrical field may be formed or created under the control of controller 244.

Although electrodes 234 are illustrated as bands of electrically conductive material extending across fluid channel 228, in a direction perpendicular to the direction in which fluid 252 is being inertially pumped by inertial pump 230, in other implementations, electrodes 234 may have other shapes and arrangements. For example, in other implementations, electrodes 234 may extend across fluid channel 228 in a direction oblique to channel 228 and oblique to the direction in which fluid 252 is being inertially pumped by inertial pump 230. In other implementations, electrodes 234 may comprise opposing electrodes on or along opposite interior faces of fluid channel 28. In other implementations, electrodes 34 may comprise interdigitated portions or may not extend completely across fluid channel 228, extending partially across fluid channel 28 or being spaced from opposite faces of channel 228.

Fluid ejector 240 selectively ejects fluid and objects from fluid channel 228. In one implementation, fluid ejector 240 selectively ejects droplets of fluid in a controlled fashion from fluid channel 228. In one implementation, fluid ejector 240 comprises an orifice or nozzle opening 260 and a fluid actuator 262. Fluid actuator 262 is positioned so as to selectively displace fluid within ejection region 233 through nozzle opening 260 in the direction indicated by arrow 259 through nozzle opening 260 into an object receiving test strip, passage, receptacle or collection reservoir 263. In one implementation, fluid actuator 262 may have a heating element (e.g., a thermal resistor) that may be heated to cause a bubble to form in a fluid proximate the heating element. Formation and subsequent collapse of such bubble may generate flow of the fluid.

In other examples, the fluid actuator(s) forming fluid ejector 240 may comprise piezo-membrane based actuators, electrostatic membrane actuators, mechanical/impact driven membrane actuators, magnetostrictive drive actuators, electrochemical actuators, external laser actuators (that form a bubble through boiling with a laser beam), other such microdevices, or any combination thereof. In some implementations, the fluid actuators may displace fluid through movement of a membrane (such as a piezo-electric membrane) that generates compressive and tensile fluid displacements to thereby displace fluid through nozzle opening 260.

Controller 244 comprises computer or electronic hardware that controls the activation of inertial pump 230, the supply of electrical current to array 32 of electrodes 234 and the activation of fluid ejector 240. Controller 244 may be a single control unit on substrate 24 or remote from substrate 24. In other implementations, the functions of controller 244 may be distributed amongst multiple separate control units, either provide on substrate 24 and/or remote from substrate 24. In one implementation, each control unit of controller 244 may comprise an integrated circuit, such as an application-specific integrated circuit. In yet another implementation, each control unit of controller 244 may comprise a processing unit that follows instructions, programming or code stored in a non-transitory computer-readable medium. Controller 244 transmits control signals, which control the activation of inertial pump 230, the supply of electrical current to array 32 of electrodes 234 and the activation of fluid ejector 240 across electrically conductive wires or traces formed upon or supported by substrate 24. In implementations where controller 270 is remote or separate from substrate 24, substrate 24 may comprise electrical contact pads, plugs or ports for electrically connecting controller 270 to the electrically conductive traces.

Controller 244 outputs control signals selectively activating inertial pumps 230. Controller 244 controls whether heterogeneous fluid or secondary fluid is being directed through channel 28. Controller 244 further controls the rate at which fluid (whether the heterogeneous fluid the secondary fluid) is inertially pumped from fluid sources 226 through the nonuniform electrical fields formed by electrodes 234. The rate at which the heterogeneous fluid or the secondary fluid is inertially pumped along fluid channel 228 may be varied by controller 244 based upon the type of the objects being targeted, the type of fluid medium carrying the objects, and/or the anticipated concentration or density of the targeted and/or nontargeted objects in the fluid.

Controller 270 outputs control signals which control the supply of electrical current to the different electrodes 234. As schematically shown by FIG. 3, in one implementation, controller 270 outputs such control signals to an electrical power frequency generating component 246 electrically connected each pair of adjacent non-uniform electrical field generating electrodes so as to control the frequency of the alternating current flowing through and across each those electrodes that are being electrically charged. In the example illustrated, each adjacent pair of electrodes 234 is provided with an alternating current having a same selected frequency. The frequency of the alternating current applied to each of the charged electrodes may vary under the control of controller 244 depending upon characteristics of the targeted objects 254, the nontargeted objects 256 and the fluid medium carrying the objects. The frequency of those charged electrodes that form a nonuniform electrical field with adjacent charged or uncharged electrodes may be selected so as to exert a dielectrophoretic force upon the targeted objects 254 and a different dielectrophoretic force (or no dielectrophoretic force) with respect to the nontargeted objects 256.

Controller 270 may output control signals controlling the ejection of fluid by fluid ejector 240. In one implementation, controller 244 may output control signals causing fluid ejector 240 to eject fluid and the nontargeted objects 256 through nozzle opening 260 while the targeted objects 254 remain retained within separation region 231 by the dielectrophoretic forces. Thereafter, controller 244 may adjust the frequency of the alternating current applied supplied to the electrodes 234 or may terminate the supply of electrical power to electrodes 234 altogether so as to release the targeted objects 24 into the secondary fluid that is pumped from fluid source 226B through fluid channel 228, carrying the released targeted objects 254 to fluid ejector 240 for ejection through nozzle opening 260.

In yet another implementation, the fluid and the nontargeted objects 256 may be inertially pumped by inertial pump 230 past or across fluid ejector 240 (as indicated by arrow 263) to a further downstream location, not using fluid ejector 240 for ejecting the fluid and nontargeted objects 256 that have passed across electrodes 234. Thereafter, controller 244 may adjust the frequency of the alternating current applied supplied to the electrodes 234 or may terminate the supply of electrical power to electrodes 234 altogether so as to release the targeted objects 254 into the secondary fluid that is pumped from fluid source 226B through fluid channel 228, carrying the released targeted objects 254 to fluid ejector 240 for ejection through nozzle opening 260.

Figure 5:
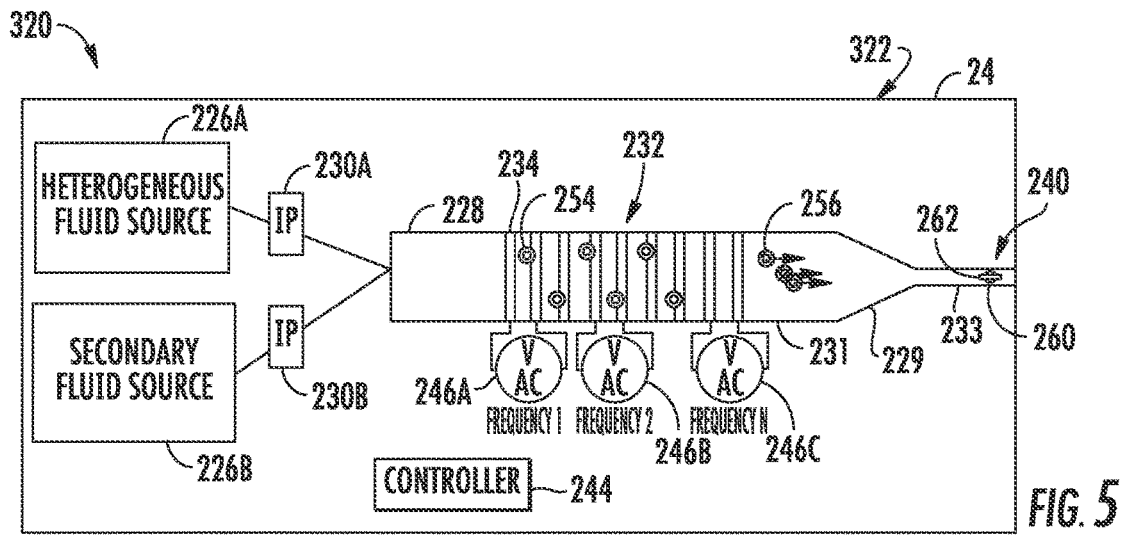
FIG. 5 is a schematic diagram illustrating portions of an example microfluidic device and an example object separator.

FIG. 5 schematically illustrates portions of an example microfluidic device 320 and portions of an example object separator 322. Object separator 322 is similar to object separator 222 described above except that object separator 322 comprises multiple electrical power frequency generating components 246A, 246B, 246C (collectively referred to as components 246) under the control of controller 244. Those remaining elements of object separator 422 which correspond to elements of object separator 222 are numbered similarly.

The different electrical power frequency generating components 246 may be operated independently of one another such that different subsets of the array 232 of electrodes 234 may be supplied with alternating current having different frequencies. The different frequencies concurrently applied to the different subsets of electrodes 234 may be chosen so as to interact with different targeted objects. For example, a first subset of the array 232 may be provided with a first frequency of alternating current that attracts (or repels) a first type of targeted object, a second subset of rate to 232 may provide with a second different frequency of alternating current that attracts (or repels) a second type of targeted object and a third subset of the array 232 may be provided with a third different frequency, different than the first frequency and different than the second frequency, that attracts (or repels) a third type of targeted object.

As a result, multiple different types of targeted objects may be concurrently retained within separation region 231 from a single pass of the heterogeneous fluid 232 through separation region 231, while the remaining nontargeted objects move out of separation region 231 for being ejected by ejector 240 or flowing further downstream past ejector 240. Thereafter, the frequency of the alternating current applied to the different subsets of array 232 may be independently adjusted or unpowered to selectively release selected portions of the total number of different types of targeted objects retained in separation region 231. For example, the alternating current supplied to the first subset 232 of electrodes 234 may be adjusted or discontinued so as to release the first type of targeted objects while the second and third type of targeted objects remain attracted to their respective second and third subsets of array 232 of electro 234. After flushing the first subset of targeted electrodes out of separation region 231 with the secondary fluid from fluid source 226B by inertial pump 230B and after discharge of the first type of target objects by ejector 240, this process may be sequentially repeated for the second and third subsets of array 232 of electrodes 234. In one implementation, nozzle opening 260 of fluid ejector 240 may be positioned above different collection reservoirs or receiving stations at different times when discharging or ejecting the different types of targeted objects.

Figure 6:
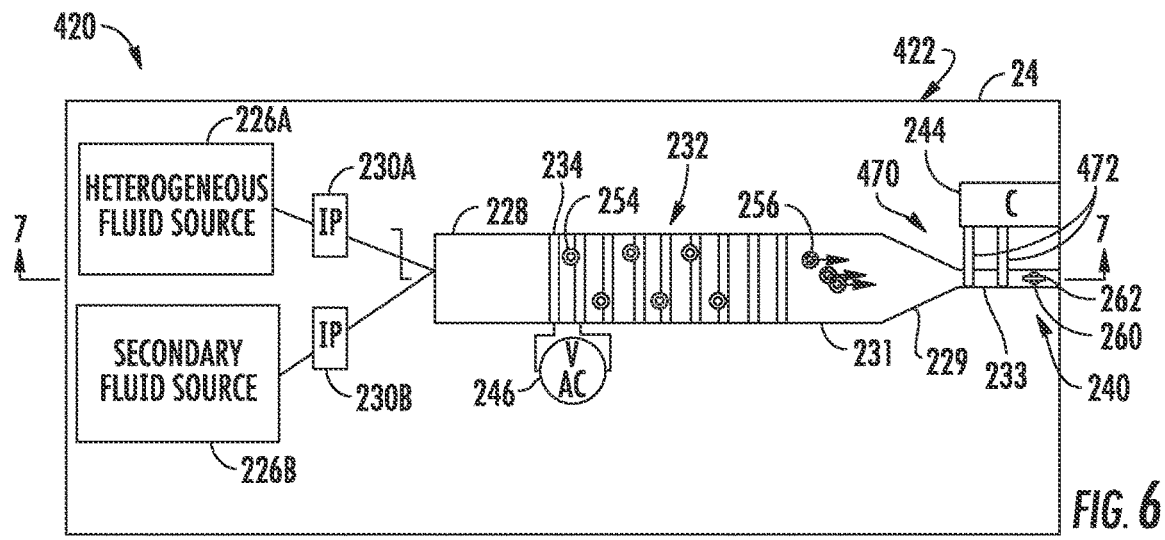
FIG. 6 is a schematic diagram illustrating portions of an example microfluidic device and an example object separator.
Figure 7:
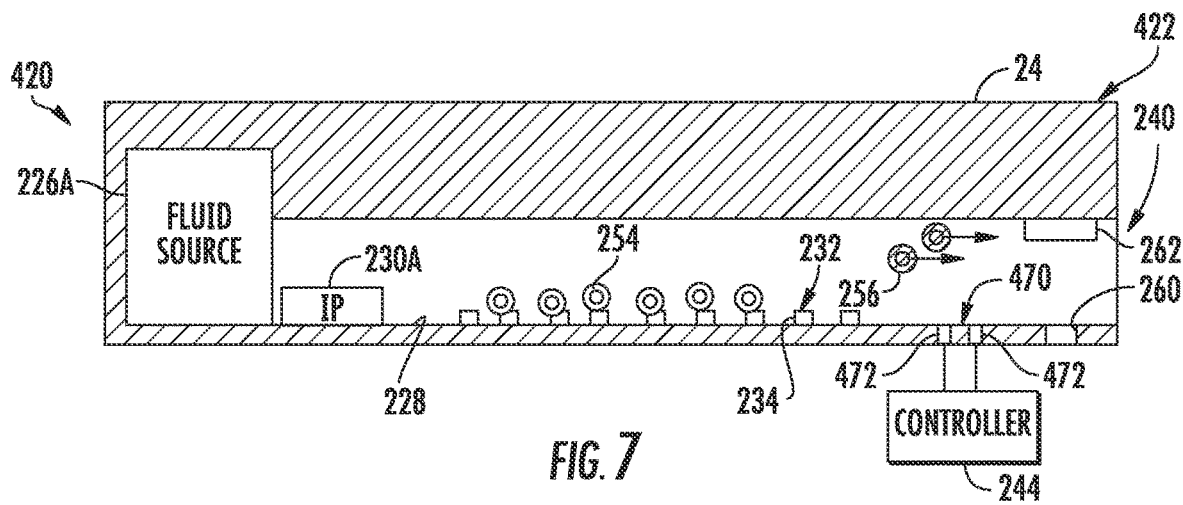
FIG. 7 is a sectional view of the object separator of FIG. 6 taken along line 6-6.

FIGS. 6 and 7 illustrate portions of an example microfluidic device 420 and portions of an example object separator 422. Object separator 422 is similar to object separator 222 except that object separator 422 additionally comprises object sensor 470. Those remaining components of object separator 422 which correspond to components of object separator 222 are numbered similarly.

Object sensor 470 senses the presence, passage or characteristics of objects. In one implementation, object sensor 470 comprises an impedance sensor formed by a pair of electrodes 472. Objects passing through the electric field between the electrodes 472 alter electrical impedance of the electrical field, wherein controller 244 senses the change in electrical impedance. In one implementation, controller 244 correlates a change in impedance to the presence or passage of so as to count the passage of objects. In one implementation, controller 244 may alternatively or additionally correlate the change of impedance to the size of the object, wherein the size of the object may be used to identify the type of object or a characteristic of the object being sensed.

In other implementations, object sensor 470 may comprise other types of sensors that detect the passage or presence of an object or characteristics of the object. For example, in other implementations, object sensor 470 may comprise an optical sensor or photosensor, having an optical emitter and an optical detector that direct light across or through portions of channel 228, wherein the presence of an object interrupts the transmission of the light and wherein the interruptions are detected by controller 244 to count the passage of objects or to identify characteristics of the object. In still other implementations, object sensor 470 may comprise other types of sensors that sense a pastor presence of an object or characteristics of the object.

In the example illustrated, object sensor 470 is located between electrodes 234 and fluid ejector 240 such a detect account objects that have exited or are about to exit separation region 231. In the example illustrated, object sensor 470 is located between the tapering region 229 and fluid ejector 240, within ejection region 233, such that the objects being sensed by sensor 470 past sensor 470 in a serial, single-file order, enhancing the counting of such objects. In other implementations, object sensor 470 may be provided at other locations.

In one implementation, controller 244 utilizes signals from object sensor 470 to adjust the operational parameters of inertial pump 230, the operational characteristics of the electrical power being supplied to electrodes 234 and/or the operation of ejector 240. For example, depending upon the rate at which objects are being supplied to fluid ejector 240, controller 244 may adjust the rate at which fluid (the heterogeneous fluid or the secondary fluid) is being inertially pumped by inertial pump 230A or 230B. After targeted objects have been ejected by fluid ejector 240, controller 244 may adjust the rate at which the fluid from fluid source 226A is pumped through fluid channel 228 based upon the number of targeted objects extracted during an earlier process. In one implementation, based upon signals from object sensor 470, controller 244 may adjust the electrical potential between adjacent electrodes, the electrical current supplied to electrodes and/or the frequency of the electrodes to enhance the separation of targeted objects. In one implementation, controller 470 may adjust the rate at which fluid ejector 240 is operated or when fluid ejector 260 is operated based upon signals from object sensor 470.

Figure 8:
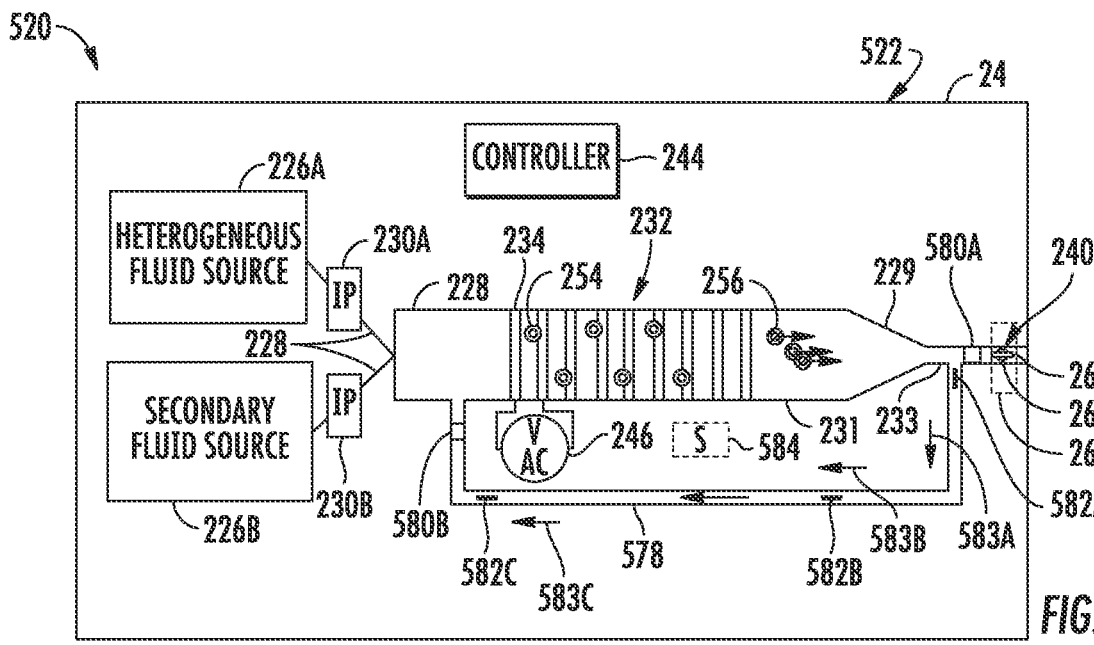
FIG. 8 is a schematic diagram illustrating portions of an example microfluidic device and an example object separator.

FIG. 8 illustrates portions of an example microfluidic device 520 and object separator 522. Object separator 522 is similar to object separator 222 described above except that object separator 522 additionally comprises recirculation passage 578, object sensors 580A, 580B, 580C (collectively referred to as object sensors 580) and inertial pumps 582A, 582B and 582O (collectively referred to as inertial pumps 582. Remaining components of microfluidic device 520 and object separator 522 which correspond to components of microfluidic device 220 and object separator 222 are numbered similarly.

Recirculation passage 578 comprises a fluid channel supported by substrate 24 having a first portion connected to fluid channel 228 on a first side of the array 232 of electrodes 234 and a second portion connected to channel 228 on a second side of the array 232 of the electrodes 234. In the example illustrated, recirculation passage 578 extends from the ejection region 233 between array 232 and fluid ejector 240 two separation region 231 between array 232 and inertial pumps 230. Recirculation passage 578 provide a channel by which fluid and objects (both targeted and nontargeted objects) that have passed array 232 may be recirculated or redirected from a downstream side back to an upstream side of array 232 to once again attempt to retain targeted objects through the application of a dielectrophoretic force upon the targeted objects entrained in the fluid.

Object sensors 580 comprise sensors that detect the presence or flow of objects (targeted and/or nontargeted) relative to such sensors. In one implementation, each of object sensors 580 may be similar to object sensor 470 described above. In some implementations, the two illustrated object sensors 580 may comprise different types of object sensors.

In the example illustrated, object sensor 580A is located between an inlet of recirculation passage 578 and fluid ejector 240. Object sensor 580 output signals to controller 244 indicating the flow of fluid and/or objects towards fluid ejector 240. In one implementation, controller 244 may utilize such signals to control the operational parameters of inertial pumps to 30, frequency generating circuit 246, fluid ejector 240 and/or inertial pumps 582.

Object sensor 580B is located along recirculation passage 578. Object sensor 580B outputs signals indicating the flow of fluid and/or objects through recirculation passage 578. In one implementation, controller 244 may utilize such signals to control the operational parameters of inertial pumps 230, frequency generating circuit 246, fluid ejector 240 and/or inertial pumps 582. Object sensor 580C is located at an inlet of holding reservoir 590. Signals from object sensor 580C may be used by controller 244 to determine the concentration or number of objects contained in holy whether 590 or the types of objects contained in holding reservoir 590.

Inertial pumps 582 are each similar to inertial pumps to 30 described above. Inertial pumps 582 are situated along recirculation passage 578, wherein inertial pump 582 may be sequentially activated to inertially pump fluid through recirculation passage 578. In the example illustrated, inertial pump 582A, 582B and 582C are asymmetrically located so as to pump fluid in the directions indicated by arrows 583A, 583B and 583C, respectively.

In one implementation, controller 244 activates inertial pumps 582 to repeatedly circulate fluid contain the targeted objects 254 across array 232 to acquire or retain a targeted quantity of the target objects 254. Once the targeted quantity or amount of targeted objects 254 has been retained along array 232, the remaining heterogeneous fluid may be discharged either by fluid ejector 240 or further downstream by passage 228. Thereafter, controller 244 may alter the operational parameters of electrical power frequency generating component 246, such as by altering the frequency of the alternating current supplied by electrical power frequency generating component 246 so as to release the retained targeted objects. Controller 244 may further activate inertial pump 230B to apply the secondary fluid from source 226B to the retained targeted objects 254, carrying the targeted objects 254 downstream for either ejection by fluid ejector 240 and/or further downstream along channel 228, for further processing or handling.

In one implementation, signals from object sensor 580B may indicate the number and/or concentration of targeted objects being recirculated along recirculation passage 578. In one implementation, controller 244 may continue recirculating fluid through recirculation passage 578 may continue to cyclically retain more and more targeted objects 254 until signals from sensor 580B indicate a concentration of targeted objects 254 below a predetermined threshold concentration level. In another implementation, the concentration of targeted objects in fluid that is passed array 232 may be determined using object sensor 580A, wherein an indicated concentration exceeding a predetermined threshold concentration may result in controller 244 further recirculating the fluid through recirculation passage 578.

In yet another implementation, as indicated by broken lines, object separator 52 may additionally comprise a sensor 584 which senses the concentration or amount of targeted objects 544 currently retained by array 232. For example, sensor 584 may comprise an optical sensor which transmits light through substrate 24 across array 232 or which is located along and within channel 228 proximate array 232 so as to optically detect the concentration or amount of targeted objects 544 currently retained by array 232 (prior to being flushed by a secondary fluid). In yet other implementations, sensor 584 may comprise other types of sensors which sensed the presence of targeted objects 254. Based upon signals from sensor 584, controller 244 may control the number of times that fluid is recirculated through recirculation passage 578, prior to being discharged by fluid ejector 240 or being discharge further downstream by channel 228.

Figure 9:
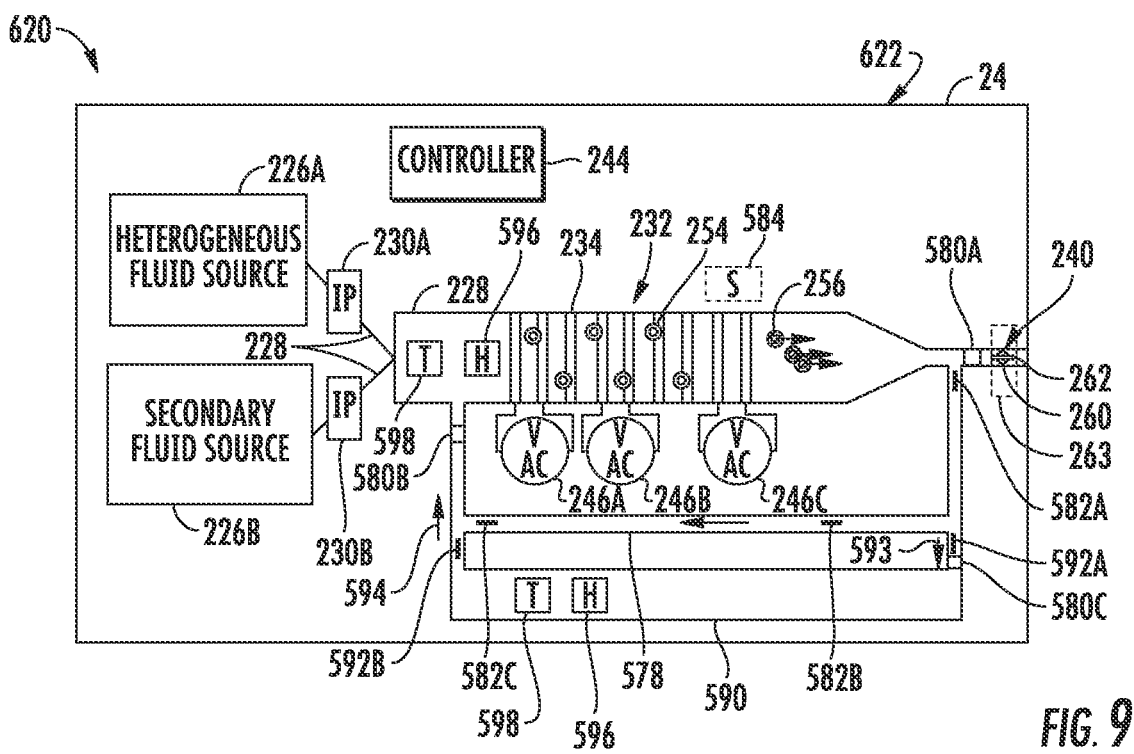
FIG. 9 is a schematic diagram illustrating portions of an example microfluidic device and an example object separator.

FIG. 9 illustrates portions of an example microfluidic device 620 and object separator 622. Object separator 622 is similar to object separator 522 except that object separator 622 comprises electrical power frequency generating components 246A, 246B and 246C (collectively referred to as components 246) and additionally comprises holding reservoir 590 and inertial pumps 592A, 592B (collectively referred to as inertial pumps 592). Those remaining components of microfluidic device 620 and object separator 622 which correspond to components of microfluidic device 520 and object separator 522 are numbered similarly.

Electrical power frequency generating components 246 are described above with respect to object separator 322. As described above, the different electrical power frequency generating components 246 may be operated independently of one another such that different subsets of the array 232 of electrodes 234 may be supplied with alternating current having different frequencies. The different frequencies concurrently applied to the different subsets of electrodes 234 may be chosen so as to interact with different targeted objects. As a result, multiple different types of targeted objects may be retained within separation region 231 from a single pass of the heterogeneous fluid through separation region 231, while the remaining nontargeted objects move out of separation region 231.

Holding reservoir 590 comprises a chamber formed within or on substrate 24 and connected to opposite sides of the array 232 of electrodes 234. In the example illustrated, holding reservoir 590 is further connected to recirculation passage 578. Holding reservoir 590 serves as a reservoir for collecting fluid and holding fluid for further separation processes.

Inertial pumps 592 are each similar to inertial pumps 230 described above. Each of such inertial pumps 592 is asymmetrically positioned so as to inertially pump fluid in a predefined direction. In the example illustrated, inertial pump 592A is asymmetrically located between a junction with recirculation passage 578 and reservoir 590 inertial pump 592A is located so as to inertially pump fluid in the direction indicated by arrow 593 towards reservoir 590. Inertial pump 592B is asymmetrically located between holding reservoir 590 and fluid channel 228 so as to inertially pump fluid in the direction indicated by arrow 594 towards fluid channel 228.

In one implementation, controller 244 activates inertial pump 230A to inertially pump fluid from heterogeneous fluid source 226A into fluid channel 228, across array 232. Prior to or as the heterogeneous fluid is flowing across array 232, controller 24 further output control signals activating at least one of components 246 such that pairs of electrodes 234 exerts dielectrophoretic force is upon objects in the heterogeneous fluid to retain the targeted objects as remaining portions of the heterogeneous fluid flow past array 232. In one operational mode, array 232 may be activated to a single frequency so as to target a single type of object. In another operational mode, controller 244 activates array 232 to multiple different frequencies so as to concurrently target multiple different types of objects within the heterogeneous fluid. During such time, controller 244 further activates inertial pumps 582 and 592. In response 592 are activated so as to function as valves, blocking the flow into reservoir 590. Pumps five E2 are activated so as to recirculate fluid for further passes across array 232. During such time, signals from object sensor 580B may be used by controller 244 to determine the number or concentration of the at least one targeted object being retained by array 232, or the concentration of targeted objects being recirculated and not yet captured by array 232.

Upon determining that a sufficient number concentration of a targeted object or multiple different types of targeted objects have been captured and are being retained by array 232, controller 244 may output control signals inactivating inertial pump 230A and activating inertial pumps 582A and 592A to inertially pump the remaining heterogeneous fluid within fluid channel 228 to a holding reservoir 590. Once the remaining fluid in fluid channel 228 has been pumped to holding reservoir 590, controller 244 may output control signals activating inertial pump 230B so as to inertially pump the secondary fluid into fluid channel 228. Prior to or as the secondary fluid is flowing across array 232, controller 244 may further output control signals to components 246 so as to release at least one type of targeted and retained object. During such time, controller 244 may also turn off or inactivate inertial pumps 582. In implementations where a single type of targeted object is captured by array 232, controller 244 may output control signals turning off all of components 246 or adjusting a frequency of the alternating current provided by component 246 such that the dielectrophoretic forces repel, rather than attract, the targeted objects.

Due to the geometry of the circulation passage 578 and fluid channel 228, the secondary fluid, carrying the released objects, flows across object sensor 580A, past recirculation passage 578. In response to receiving signals from object sensor 580A indicating the presence of targeted objects, controller 244 may further output control signals to fluid ejector 240 so as to eject the targeted objects into a destination, such as a collection reservoir 263.

In implementations where multiple different types of targeted objects have been concurrently captured by array 232, controller 244 may selectively turn off individual components 246 or may selectively adjust a frequency of the alternating current provided by the individual components 246 such that selected electrode pairs exert dielectrophoretic forces to repel selected targeted objects. During such time, fluid ejector 240 may be positioned over different collection reservoirs, wherein controller 244 outputs control signals causing fluid ejector 2402 eject the selected target object into the different collection reservoirs. In one implementation, the release of targeted objects by array 232 may occur one at a time, wherein different types of targeted objects are ejected into different collection reservoirs. In another implementation, different types of targeted objects may be concurrently released to form a mixture of the selected object types, wherein the mixture is then ejected by fluid ejector 2402 a collection reservoir.

After the targeted objects have been released and ejected, controller 244 may output control signals activating inertial pump 5928 so as to inertially pump fluid from holding reservoir 590 into fluid channel 228. Controller 244 may output control signals activating components 246 so as to form nonuniform electric fields which exert dielectrophoretic forces upon targeted objects of the remaining fluid from holding reservoir 590. The process described above is then repeated for the targeted object contained in the fluid from holding reservoir 590. In one mode of operation, controller 244 may additionally activate inertial pump 230A to inertially pump additional heterogeneous fluid into fluid channel 228 for combining with the fluid from holding reservoir 590. In another mode of operation, inertial pump 230A may remain in active, where just the fluid from reservoir 590 is circulated across array 232.

As further indicated by broken lines, in some implementations, microfluidic device 620 and object separator 622 may additionally comprise a heater 596 and a temperature sensor 598 (schematically illustrated). Heater 596 may extend below electrodes 234 or along a side of channel 228. In one implementation, heater 596 may comprise a thermal resistor. Heater 596 heats the fluid within channel 228. Temperature sensor 598 senses the temperature the fluid within channel 228 and output signals to controller 244, wherein controller 244 may adjust the operational parameters of heater 596. The use of heater 596 and temp sensor 598, controller 244 may provide the fluid within channel 228 with a predetermined temperature and/or maintain a temperature of the fluid within channel 228. In some implementations, fluid holding reservoir 590 may additionally include a heater 596 and a temperature sensor 598 to facilitate control over the temperature of the fluid within holding reservoir 590 by controller 244. In other implementations, heater 596 and temp sensor 598 may be omitted.

Object separator 622 is illustrated as a combination of multiple features from the above-described object separators. It should be appreciated that object separator 622 may omit selected features. For example, in one implementation, upper sieve or 622 may comprise a single component 246, wherein each of the electrodes 234 is supplied with an alternating current of a single frequency during the flow of fluid across array 232. In one implementation, object separator 622 may omit holding reservoir 590 and inertial pumps 592. In another implementation, object separator 622 may omit at least one of object sensors 580. In some implementations, object separator 622 may omit fluid ejector 240, wherein fluid is discharged by being directed to further downstream along fluid channel 228. As noted above, in some implementations, object severs 622 may have a single inertial pump 230 in a single fluid source or port through which heterogeneous fluid and the secondary fluid are supplied in turn. Although object separator 622 is illustrated as comprising nine electrodes 234, in other implementations, object separator 622 may comprise a fewer or greater of such electrodes 234. As discussed above, electrodes 234 may themselves have varying sizes, shapes and arrangements.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An object separator for separating an object in a fluid, the object separator comprising:
    a substrate;
    a fluid channel supported by the substrate;
    a pair of electrodes along the fluid channel to form a dielectrophoretic force to interact with an object entrained in a fluid; and
    an inertial pump supported by the substrate and positioned within the fluid channel to move the fluid along the fluid channel.

2. The object separator of claim 1 further comprising a fluid ejector to eject fluid from the channel.

3. The object separator of claim 1 further comprising a second pair of electrodes along the fluid channel to form a second dielectrophoretic force, different than the first dielectrophoretic force, to interact with a second object, different than the first object, entrained in the fluid.

4. The object separator of claim 1 further comprising:
    a recirculation passage supported by the substrate, the recirculation passage having a first portion connected to the channel on a first side of the pair of electrodes and a second portion connected to the channel on a second side of the pair of electrodes; and
    a second inertial pump supported by the substrate to move the fluid along the recirculation passage.

5. The object separator of claim 4, wherein the second inertial pump comprises a thermal resistor.

6. The object separator of claim 1, wherein the inertial pump comprises a thermal resistor.

7. The object separator of claim 4 further comprising a holding reservoir connected to the recirculation passage.

8. The object separator of claim 1 further comprising an object sensor supported by the substrate.

9. The object separator of claim 8 further comprising a controller to adjust an operational parameter of at least one of the inertial pump and the pair of electrodes based upon signals from the object sensor.

10. A method for separating an object in a fluid, the method comprising:
moving fluid through a channel of a substrate with an inertial pump supported by the substrate and positioned with the channel; and
applying a dielectrophoretic force to an object entrained in the fluid to separate the object from other objects in the fluid.

11. The method of claim 10 further comprising ejecting fluid from the channel through a nozzle with a fluid actuator.

12. The method of claim 10, wherein the dielectrophoretic force is applied with a pair of electrodes.

13. The method of claim 11, further comprising recirculating fluid through a recirculation passage from a first side of the pair of electrodes to a second side of the pair of electrodes.

14. The method of claim 10, further comprising heating the fluid using a thermal resistor associated with the inertial pump.

15. The method of claim 10, further comprising moving the fluid along a recirculation passage supported by the substrate.

16. The method of claim 15, wherein moving the fluid along the recirculation passage is by a second inertial pump.

17. The method of claim 10, further comprising adjusting an operational parameter using a controller.

18. The method of claim 17, wherein adjusting the operational parameter includes adjusting the inertial pump to move the fluid along the fluid channel, adjusting electrodes positioned along the fluid channel to control the dielectrophoretic force, or both.

19. The method of claim 10, further comprising sensing the object in the fluid using an object sensor.

20. The method of claim 19, further comprising adjusting an operational parameter of the inertial pump, adjusting electrodes positioned along the fluid channel to control the dielectrophoretic force, or both based on sensing of the objects in the fluid.

* * * * *